(12) United States Patent
Yokoyama

(10) Patent No.: US 9,440,697 B1
(45) Date of Patent: Sep. 13, 2016

(54) MOTORCYCLE FRONT STRUCTURE

(71) Applicant: Kawasaki Jukogyo Kabushiki Kaisha, Hyogo (JP)

(72) Inventor: Miki Yokoyama, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 14/834,296

(22) Filed: Aug. 24, 2015

(51) Int. Cl.
*B62J 15/00* (2006.01)
*B62J 6/02* (2006.01)

(52) U.S. Cl.
CPC .. *B62J 15/00* (2013.01); *B62J 6/02* (2013.01)

(58) Field of Classification Search
CPC ............. B62J 15/00; B62J 15/02; B62J 6/02
USPC ............... 180/152.1, 152.2, 152.3; 296/77.1, 296/78.1; 280/152.1, 152.2, 152.3
See application file for complete search history.

(56) References Cited

U.S. PATENT DOCUMENTS

| | | | | |
|---|---|---|---|---|
| 4,982,973 A | * | 1/1991 | Saito | B60K 11/08 180/229 |
| 6,702,311 B2 | * | 3/2004 | Tsukiji | B62J 17/04 180/219 |
| 8,845,011 B2 | * | 9/2014 | Nakagawa | B62J 15/00 296/193.09 |

* cited by examiner

*Primary Examiner* — John Walters

(57) ABSTRACT

A motorcycle includes a front fender for covering above a front wheel and a headlamp device positioned forwardly of a handlebar. At a portion of an upper surface of the front fender forwardly of the headlamp device, a recess is formed which is depressed downwardly and extends in a forward and rearward direction. A projection protruding upwardly towards the rear is formed in an intermediate portion of a rear half portion of the recess with respect to a motorcycle widthwise direction. The headlamp device has a lower end formed with a recessed area in which the projection is engageable.

12 Claims, 8 Drawing Sheets

MOTORCYCLE FRONT STRUCTURE

BACKGROUND OF THE INVENTION

1. Field of the Invention

The present invention relates to a motorcycle front structure in which motorcycle mounted components are disposed forwardly of a handlebar and a front fender covers above a front wheel.

2. Description of Related Art

In an off-road version of motorcycle that is suited for use on an rough terrain, a large front fender is mounted above the front wheel so that muddy water swirled upwardly by the rotating front wheel can be repelled in contact with an undersurface of the front fender so as to fall downwardly. In this respect, see, for example, U.S. Pat. No. 8,845,011. It has, however, been found that if the muddy water are swirled upwards on a large scale, it flows rearwardly away from an upper surface of the front fender enough to soil vehicle mounted components, such as, for example, a headlamp device, that are disposed above the front fender.

SUMMARY OF THE INVENTION

In view of the above discussed inconveniences and problems, the present invention has been devised and is intended to provide a front structure of a motorcycle capable of avoiding soiling of the motorcycle mounted component that are disposed forwardly of the handlebar and above the front fender.

In order to accomplish the foregoing object, the front structure of the motorcycle includes a front fender to cover above a front wheel and a motorcycle mounted component that is disposed forwardly of a handlebar. A recess is defined at a portion of an upper surface of the front fender forwardly of the motorcycle mounted component and is depressed downwardly and extending in a forward and rearward direction of the motorcycle. A projection is defined at an intermediate portion, with respect to a motorcycle widthwise direction, at least in a rear half portion of the recess and this projection extends upwards towards a rear. The motorcycle mounted component referred to above has a lower end edge formed with a recessed area in which the projection engages.

According to the present invention, the projection is formed within the recess and a recessed area in which the projection is engaged is formed in a lower end edge of the motorcycle mounted component. Accordingly, muddy water introducing into the recess is deflected by the projection of the front fender to an outer side and, therefore, flow of muddy water towards the motorcycle mounted component can be avoided. As a result, spoilage of the motorcycle mounted component can be avoided. Also, formation of surface irregularities in the front fender is effective to increase the rigidity of the front fender.

In the practice of the present invention, the projection preferably has a rear portion protrudes upwardly of the upper surface of the front fender. According to this feature, the rear portion of the projection protruding upwardly of the upper surface of the front fender is effective to avoid flows of the muddy water towards the motorcycle mounted component.

Also in the practice of the present invention, the projection preferably includes an upper edge, which protrudes upwardly towards the rear, and a pair of left and right side faces inclined downwardly from the upper edge towards a lateral outside with respect to the motorcycle widthwise direction, in which case the left and right side faces have respective lower edges extending outwardly with respect to the motorcycle widthwise direction towards the rear. According to this structural feature, the incoming wind and the muddy water are smoothly guided towards the outward with respect to the motorcycle widthwise direction by the inclined side faces of the projection. Accordingly, the flow of the muddy water towards the motorcycle mounted component can be effectively avoided.

Furthermore, where the lower edges of the side faces of the projection extend rearwardly towards an outer side with respect to the motorcycle widthwise direction, the lower edges of the left and right side faces preferably extend rearwardly to an outer side edge of the front fender with respect to the motorcycle widthwise direction. According to this feature, the lower edge of the motorcycle mounted component comes to assume an inverted V-shaped configuration and the upper surface of the front fender engageable therewith also comes to assume a V-shaped configuration. Accordingly, as compared with the case in which the both are formed to assume a W-shaped configuration, a gap between the motorcycle mounted component and the front fender, which results from a variation of the manufacturing dimensions, can be minimized.

Yet, where the lower edges of the left and right side faces extend to an outer side edge of the front fender with respect to the motorcycle widthwise direction, a pair of left and right inclined faces continued to a rear end of the side face of the projection are preferably formed in a front surface of the motorcycle mounted component. According to this feature, the incoming wind guided by the side face of the projection in the front fender is guided by the inclined faces towards an outer side of the motorcycle widthwise direction and, therefore, the spoilage of the motorcycle mounted component by and in contact with the muddy water can be further avoided.

In one preferred embodiment of the present invention, the projection may extend from an intermediate portion of the recess with respect to a forward and rearward direction, in which case, in a region of the upper surface of the front fender forwardly of the intermediate portion of the recess with respect to the forward and rearward direction, a side groove is formed so as to be positioned at an outer side of the recess with respect to the motorcycle widthwise direction and to extend in the forward and rearward direction. According to this feature, at locations forwardly and rearwardly of the intermediate portion of the recess with respect to the forward and rearward direction, the sectional shape of the front fender becomes a wavy or corrugated shape. Accordingly, the rigidity of the front fender increases.

In the practice of the present invention, the motorcycle mounted component preferably has a front surface extending substantially vertical with respect to the upper surface of the front fender. According to this feature, the muddy water can be prevented from running over the motorcycle mounted component.

Moreover in the practice of the present invention, the recess referred to above preferably has an upper end positioned above a lower surface of a lower bracket for supporting a front fork. In such case, the motorcycle mounted component preferably has a lower edge positioned below an upper surface of the lower bracket. According to this feature, the gap between the lower end of the motorcycle mounted component and the upper surface of the front fender can be closed up by the lower bracket. Therefore, the flow of the incoming wind and the muddy water through the gap can be suppressed and, hence, the spoilage of the motorcycle mounted component by and in contact with the muddy water can be avoided.

In another preferred embodiment of the present invention, the lower bracket preferably has a lower portion to which the front fender is fixed, in which case the lower bracket also has an upper portion to which a lower end portion of the motorcycle mounted component is fixed. According to this feature, the lower bracket can be so disposed as to close up the gap between the lower end of the motorcycle mounted component and the upper surface of the front fender. Accordingly, the flow of the incoming wind and the muddy water through the gap is suppressed and, therefore, the spoilage of the motorcycle mounted component by and in contact with the muddy water can be avoided.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, a preferred embodiment of the present invention will be described in detail with particular reference to the accompanying drawings. Before the description of the present invention proceeds, it is to be noted that the terms "left" and "right" used herein are intended to denote opposite positions or directions, respectively, relative to a motorcycle rider or motorist then occupying a motorcycle rider's seat and looking forwards in a direction parallel to the longitudinal sense of the motorcycle.

Figure 1:
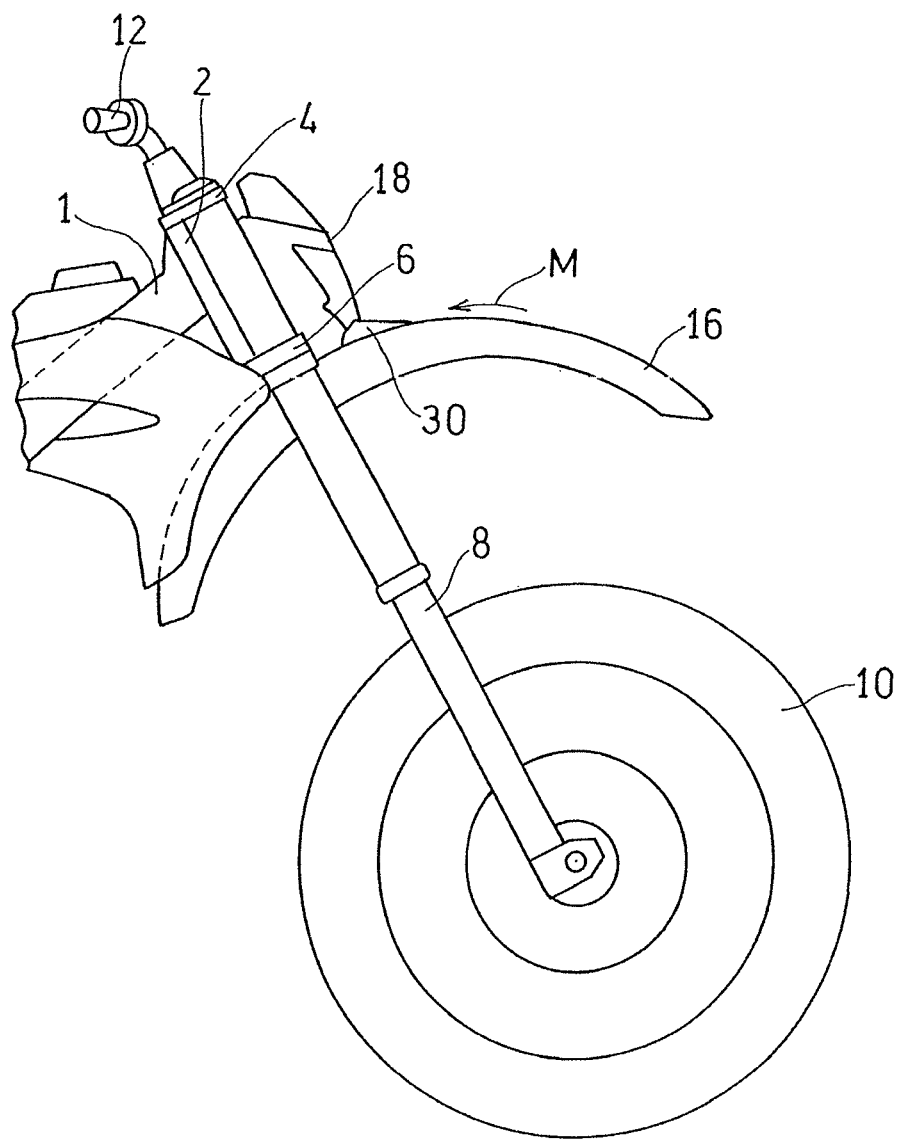
FIG. 1 is a schematic side view showing a front portion of a motorcycle equipped with a front structure designed in accordance with a preferred embodiment of the present invention.

FIG. 1 is a schematic side view of a front portion of a motorcycle equipped with a front structure designed in accordance with a preferred embodiment of the present invention. The illustrated motorcycle is of an off-road version suited for running on a rough terrain or mountain roads or of a type suited for a circuit racing. As shown therein, a head pipe 2 is fitted to a front end portion of a main frame 1 which is a part of a motorcycle frame structure, and a steering shaft (not shown) is rotatably inserted in the head pipe 2. An upper bracket 4 and a lower bracket 6 are fitted to the steering shaft, and a front fork 8 is supported by the upper bracket 4 and the lower bracket 6. A steering handlebar 12 is supported by the upper bracket 4 and a front wheel 10 is supported by a lower end portion of the front fork 8.

A front fender 16 for covering above the front wheel 10 is provided at a location spaced a considerable distance radially outwardly from the front wheel 10 and is supported by the lower bracket 6. A headlamp device 18, which is a kind of motorcycle mounted components, is disposed forwardly of the handlebar 12, more particularly on a front surface side of an upper portion of the front fork 8. The headlamp device 18 is disposed at a location above the front fender 16 and is supported by the upper bracket 4 and the lower bracket 6. This headlamp device 18 has a front surface extending in a direction substantially perpendicular to an upper surface of the front fender 16.

Figure 2:
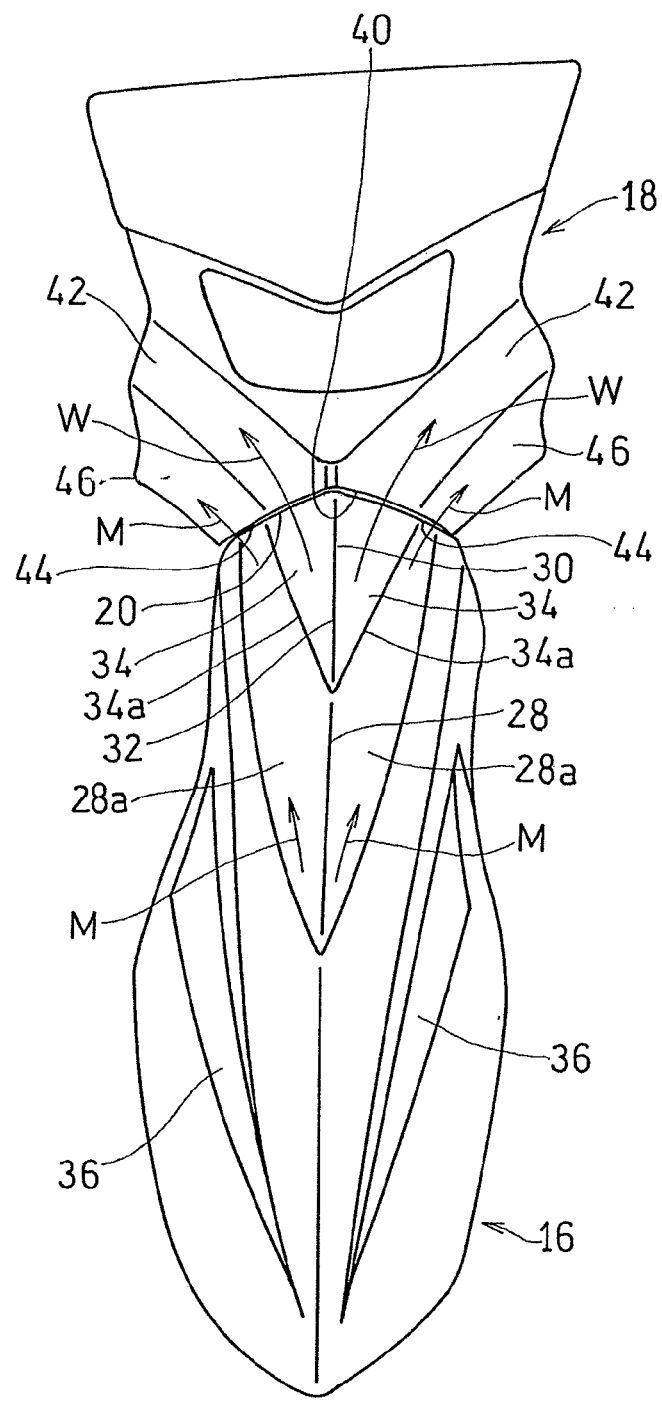
FIG. 2 is a perspective view showing the front structure for the motorcycle as viewed from front in a diagonally upward direction.

As shown in FIG. 2, the headlamp device 18 has a lower end edge 20 held in abutment with the upper surface of the front fender 16, and the headlamp device 18 and the front fender 16 are fixed after having been positioned by an engagement structure as will be described in detail later.

Figure 3:
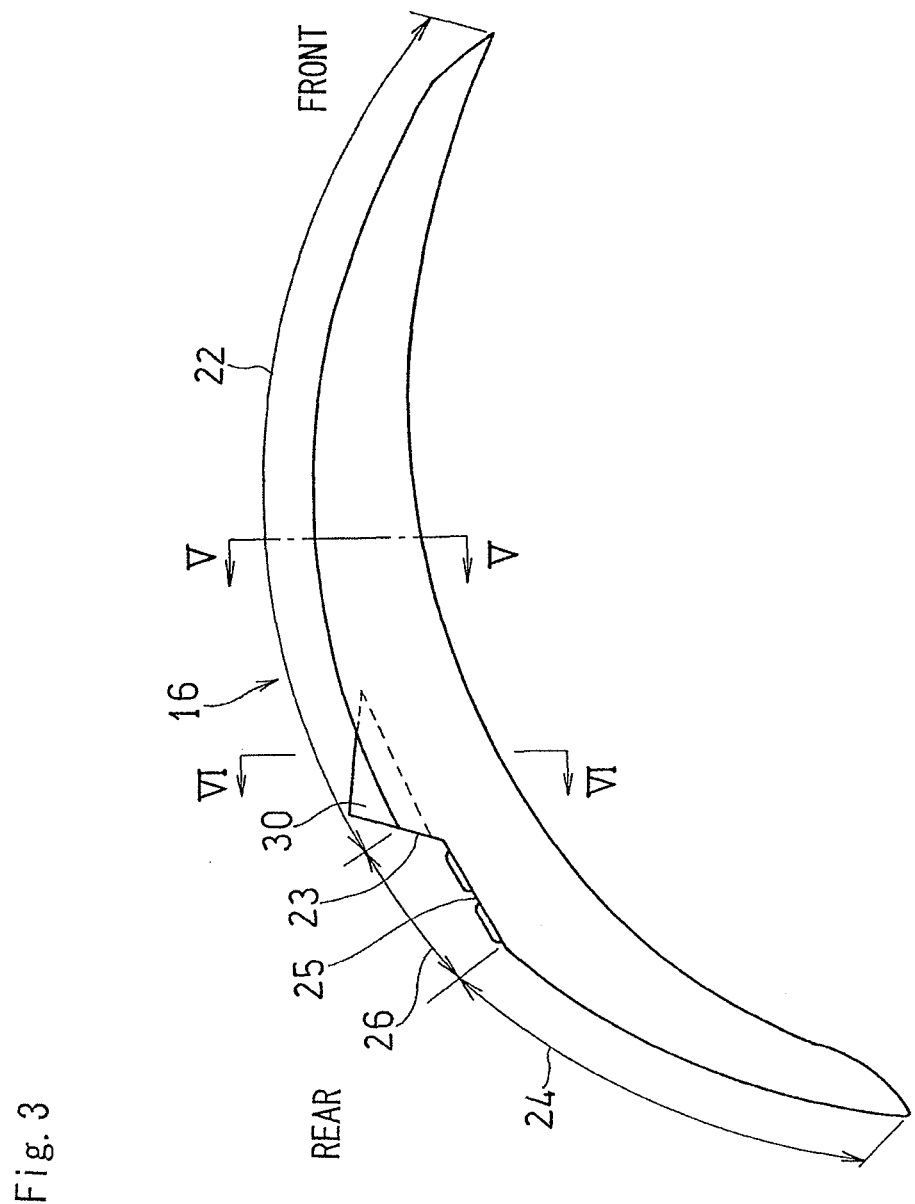
FIG. 3 is a schematic side view showing a front fender employed in the motorcycle.
Figure 4:
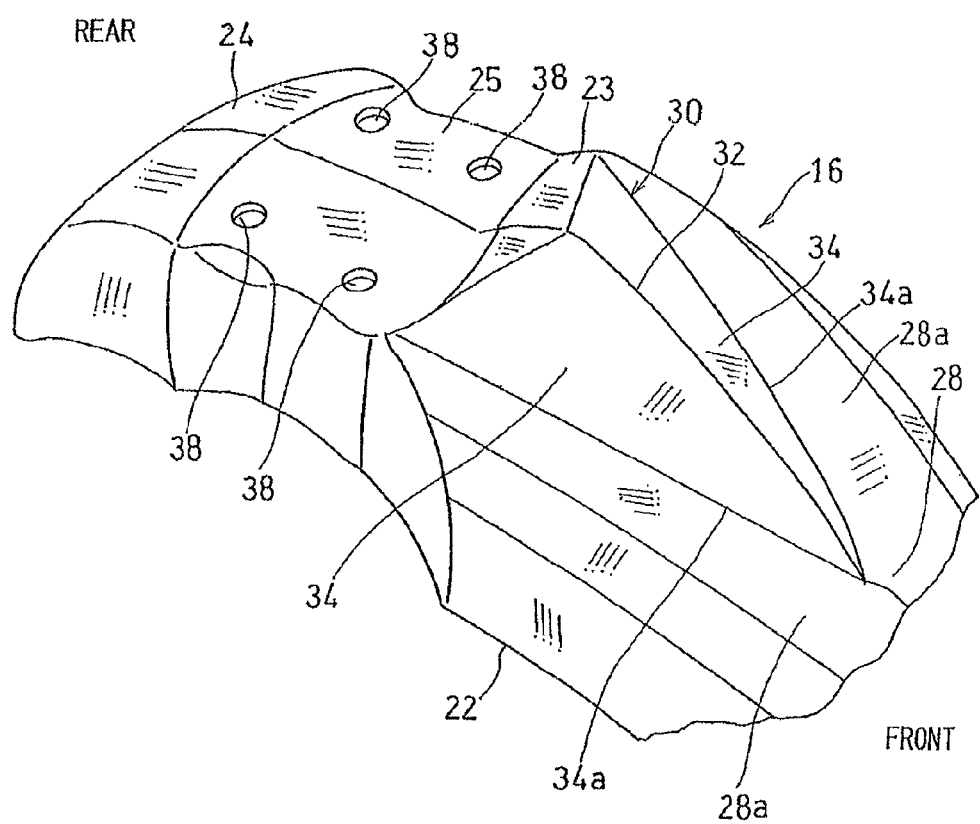
FIG. 4 is a perspective view showing, on an enlarged scale, the front fender.

FIGS. 3 and 4 illustrate a schematic side view and a perspective view of the front fender 16, respectively. The front fender 16 shown in FIG. 3 includes a fender front portion 22, a fender rear portion 24, and a to-be-supported portion 26 formed between the fender front portion 22 and the fender rear portion 24. The fender front portion 22 is so positioned forwardly of the front fork 8 shown in FIG. 1 as to cover above the front wheel 10, whereas the fender rear portion 24 is so positioned rearwardly of the front fork 8 as to cover above and rearwardly of the front wheel 10. To-be-supported portion 26 includes a stepped face 23, which is continued to a rear end of the fender front portion 22 and extends diagonally rearwardly and downwardly, and a flat face 25 continued to a rear end of the stepped face 23 and recessed downwardly beyond the fender front portion 22.

Figure 5:
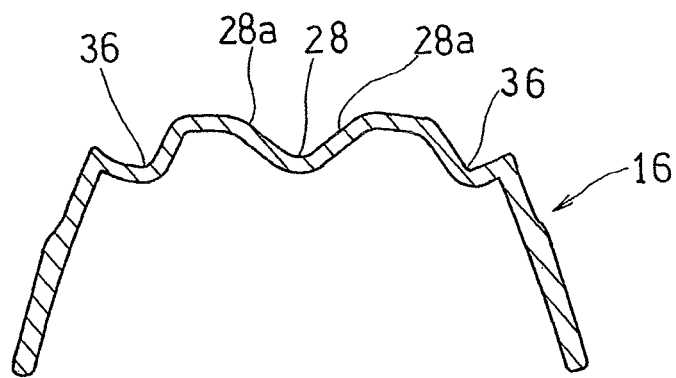
FIG. 5 is a cross sectional view taken along the line V-V in FIG. 3.

As shown in FIG. 4, a portion of an upper surface of the fender front portion, which is intermediate of the motorcycle widthwise direction, is formed with a recess 28 that extends forwardly from a rear end of the fender front portion 22. The recess 28 is so formed in the upper surface of the front fender 16 as to be depressed downwardly while extending in a forward and rearward direction or longitudinal direction. The recess 28 is, as shown in FIG. 5, is in the form of a downwardly tapered recess of a triangular sectioned shape.

As shown in FIG. 2, the recess 28 is formed in a portion of the upper surface of the front fender 16 and at a location forwardly of the headlamp device 18. The recess 28 is positioned at the intermediate portion of the front fender 16 with respect to the motorcycle widthwise direction and is of a shape tapering towards the front. A projection 30 protruding upwardly towards the rear is formed in an intermediate portion of a rear half portion of the recess 28, shown in FIG. 3, with respect to the motorcycle widthwise direction. The projection 30 is formed at the intermediate portion of the front fender 16 with respect to a leftward and rightward direction or motorcycle widthwise direction. The projection 30 has a rear portion protruding upwardly beyond the upper surface of the front fender 16.

As shown in FIG. 2, the projection 30 referred to above is made up of an upper edge 32 of a ridge shape protruding so as to point upwards towards the rear, and a pair of left and right side faces 34 and 34 inclined downwardly from the upper edge 32 towards an lateral outside with respect to the motorcycle widthwise direction. Each of those left and right side faces 34 may be either a flat surface or a curved surface bulging somewhat outwardly.

Respective lower edges 34a and 34a of the left and right side faces 34 and 34 extend in a direction outwardly with respect to the motorcycle widthwise direction towards the rear. The respective lower edges 34a and 34a of those left and right side surfaces 34 and 34 extend rearwardly to respective outer side edges of the front fender 16 with respect to the motorcycle widthwise direction.

The projection 30 referred to above extends rearwardly from an intermediate portion of the recess 28 with respect to the forward and rearward direction. In a region forwardly of the intermediate portion of the recess 28 with respect to the forward and rearward direction in the upper surface of the front fender 16, a pair of left and right side grooves 36 are formed so as to extend in the forward and rearward direction. Those side grooves 36 are positioned on outer sides of the recess 28 with respect to the motorcycle widthwise direction in the upper surface of the front fender 16. Those side grooves 36 are, when viewed from top, so inclined that they may cross from left and right sides of the projection 30 in a forward direction.

Figure 6:
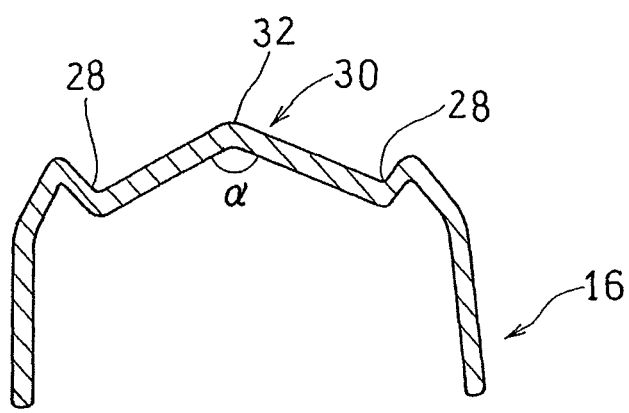
FIG. 6 is a cross sectional view taken along the line VI-VI in FIG. 3.

The projection 30 is of a pointed shape tapering upwardly and, more particularly, as shown in FIG. 6, represents a triangular sectioned shape. The projection 30 has an apex angle α within the range of 110 to 150° and, preferably, within the range of 120 to 140° as measured in a cross-section. It is, however, to be noted that in the practice of the embodiment now under discussion the apex angle α is chosen to be about 130°. Four bolt insertion holes 40 oriented in the up and down direction are formed in the flat face 25 of the front fender 16 shown in FIG. 4.

The lower end edge 20 of the headlamp device 18 shown in FIG. 2 is formed with a recessed area 40 for receiving the projection 30. Specifically, in correspondence with the projection 30 of the triangular sectioned shape, the lower end edge 40 of the headlamp device 18 is also shaped to represent a triangular shape when viewed from front.

A pair of left and right inclined faces 42 continued from a rear end of the side face 34 of the projection 30 are formed in a front surface of the headlamp device 18. The inclined face 42 is oriented diagonally forwardly and outwardly and is inclined outwardly with respect to the motorcycle widthwise direction towards the rear. Also, the lower end edge 20 of the headlamp device 18 includes a pair of left and right lower end edge side portions 44 and 44, which are positioned on an outer side of the recessed area 40, and a lower side face 46 continued to a lower region of the inclined face 42 is formed rearwardly of each of the lower end edge side portion 44. The lower side face 46 has a lower edge so curved to protrude laterally outwardly so that muddy water M flowing rearwardly along the inclined face 28a of the recess 28 can be smoothly guided outwards.

Figure 7:
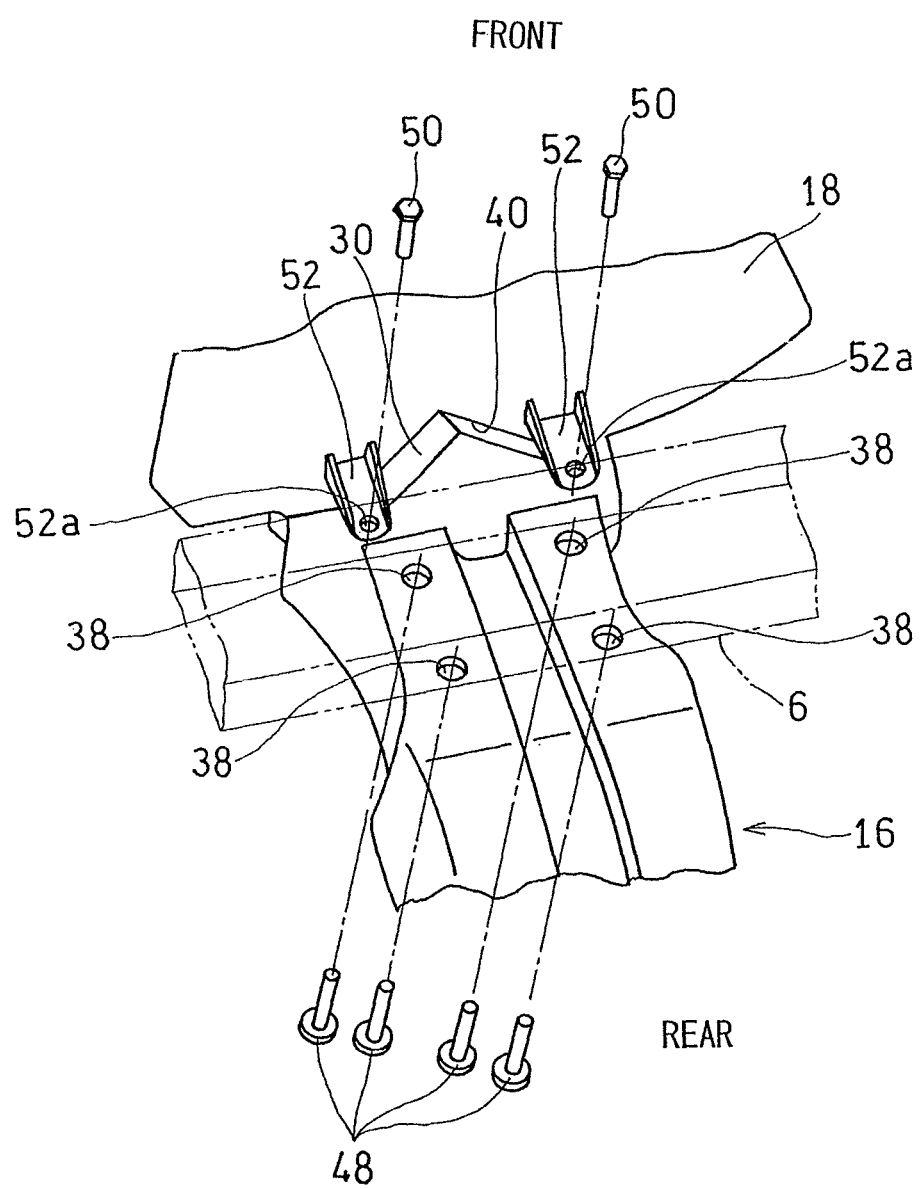
FIG. 7 is a perspective view showing an engaged portion between the front fender and a headlamp device, as viewed from rear in a diagonally lateral direction.
Figure 8:
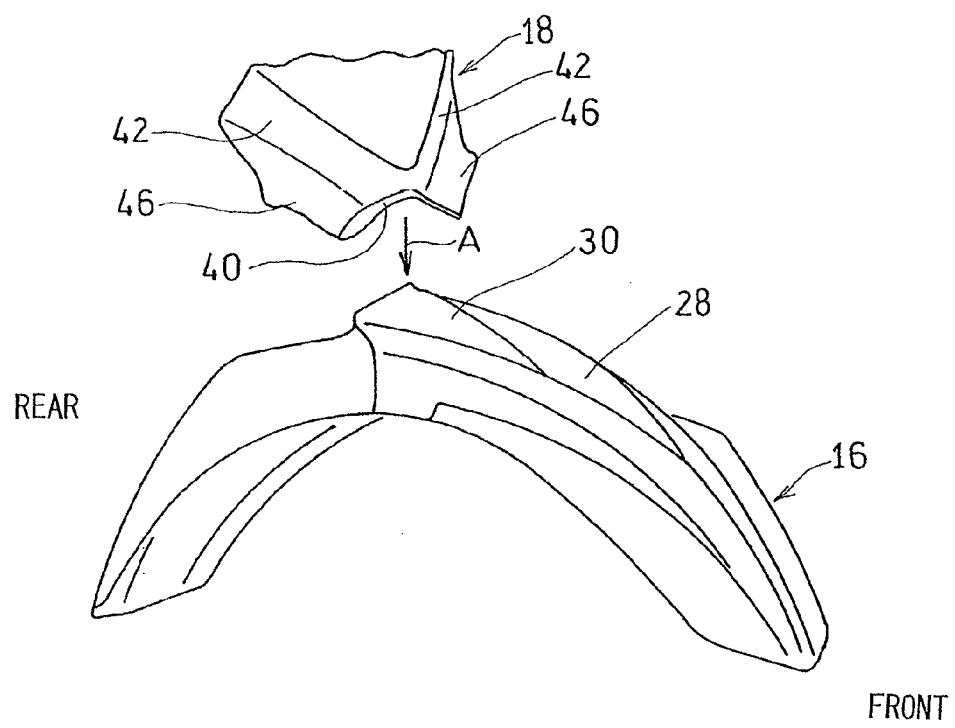
FIG. 8 is a perspective view showing the front portion of the motorcycle as viewed from front in the diagonally upward direction.
Figure 9:
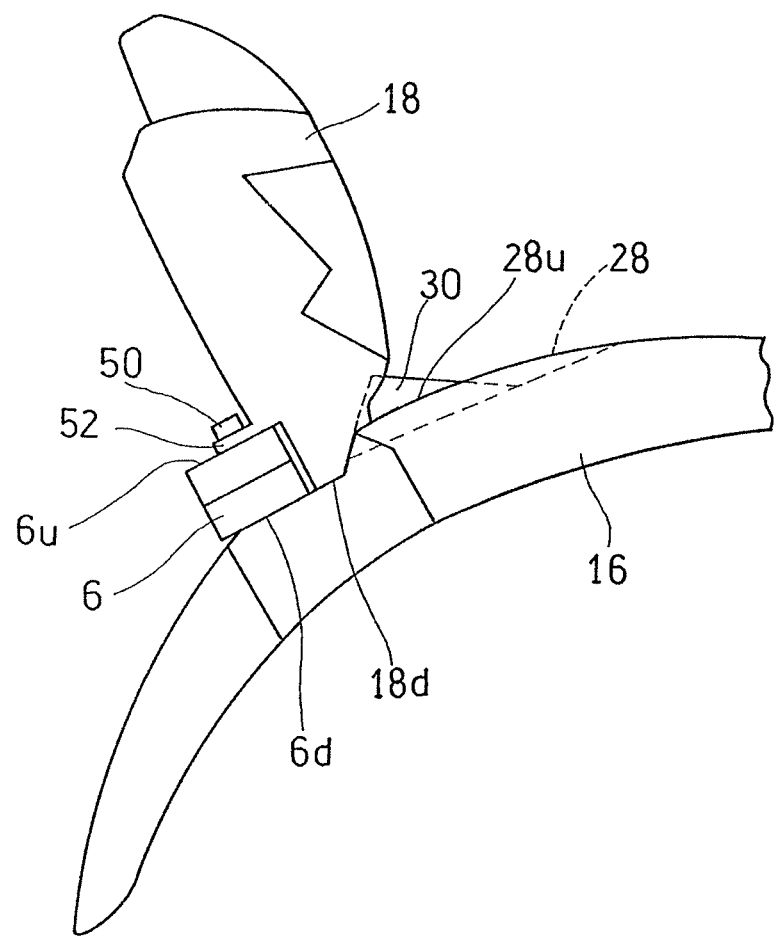
FIG. 9 is a schematic side view showing, on an enlarged scale, the front structure of the motorcycle.

With reference to FIGS. 7 to 9, the manner of assembling the front fender 16 and the headlamp device 18 onto the motorcycle body will be described. At the outset, as shown in FIG. 7, four bolts 48 are inserted from below into the bolt insertion holes 38 defined in the front fender 16, followed by threading them into threaded holes (not shown) provided in the lower bracket 6 (shown in FIG. 1) to thereby fit the front fender 16 to an undersurface of the lower bracket 6. Accordingly, as shown in FIG. 9, an upper end 28u of the recess 28 is positioned above the undersurface 6d of the lower bracket 6.

Subsequently, the headlamp device 18 shown in FIG. 8 is moved downwards (in a direction shown by the arrow A) so that the recessed area 40 in the headlamp device 18 may be engaged with the projection 30 in the front fender 16. At this time, as the recessed area 40 of a triangular shape in the headlamp device 18 is engaged in the projection 30 of the correspondingly triangular sectioned shape, the headlamp device 18 is guided to a desired position and, hence, the positioning of the headlamp device 18 is smoothly performed.

Starting from this condition, the headlamp device 18 has a lower portion provided with a pair of left and right brackets 52 and 52, and bolts 50 are inserted from above into insertion holes 52a formed in the brackets 52 and 52 and are then threaded into threaded holes (not shown) formed in the lower bracket 6. By so doing, the lower portion of the headlamp device 18 is fitted to the lower bracket 6. An upper portion of the headlamp device 18 is fitted to the upper bracket 4 (shown in FIG. 1) by means of a bolt (not shown). In this way, the lower edge 18d of the headlamp device 18 is positioned downwardly of the upper surface of the lower bracket 6 shown in FIG. 9. Thus, the front fender 16 is fixed to the lower portion of the lower bracket 6 and the lower end portion of the headlamp device 18 is fixed to the upper portion of the lower bracket 6.

According to the preferred embodiment hereinbefore fully described, as shown in FIG. 2, the projection 30 is formed within the recess 28 in the front fender 16, and the lower end edge 20 of the headlamp device 18 is formed with the recessed area 40 with which the projection 30 is engageable. Accordingly, the muddy water M intruding within the recess 28 is deflected in an outer side by the projection 30 of the front fender 16 so as not to flow towards the headlamp device 18. As a result thereof, spoilage of the headlamp device 18 is avoided. Also, formation of surface irregularities in the front fender 16 is effective to increase the rigidity of the front fender 16.

As shown in FIG. 1, the rear portion of the projection 30 proximate to the headlamp device 18 protrudes upwardly of the upper surface of the front fender 16. Accordingly, flow of the muddy water M towards the headlamp device 18 can be effectively avoided.

The projection 30 best shown in FIG. 2 includes the upper edge 32, which protrudes upwardly towards the rear, and a pair of left and right side faces 34 and 34 inclined downwardly from the upper edge 32 towards a lateral outside with respect to the motorcycle widthwise direction, and the left and right side faces 34 and 34 have the respective lower edges 34a and 34a extending outwardly with respect to the motorcycle widthwise direction towards the rear. Accordingly, by the inclined side faces 34 and 34 of the projection 30, the incoming wind W and the muddy water M are smoothly guided towards the outer side with respect to the motorcycle widthwise direction. Hence, the flow of the muddy water M towards the headlamp device 18 can be effectively avoided.

Also, the lower edges 34a and 34a of the left and right side faces 34 and 34 extend to an outer side edge of the front fender 16 with respect to the motorcycle widthwise direction. Accordingly, the lower edge 20 of the headlamp device 18 assumes an inverted V-shaped configuration and, on the other hand, the upper surface of the front fender 16 engageable therewith also assumes a V-shaped configuration. Therefore, as compared with the case in which the both are formed to assume a W-shaped configuration, a gap between the headlamp device 18 and the front fender 16, which results from a variation of the manufacturing dimensions, can be minimized.

A pair of left and right inclined faces 42 and 42 continued to a rear end of the side faces 34 and 34 of the projection 30 are formed in a front surface of the headlamp device 18. Thus, the incoming wind carrying the muddy water M and guided by the side face 34 of the projection 30 in the front fender 16 is guided outwardly with respect to the motorcycle widthwise direction by the inclined faces 42 of the headlamp device 18 and, therefore, the spoilage of the headlamp device 18 by and in contact with the muddy water M can be further avoided. Also, since the upper surface of the lower side surface 46 of the headlamp device 18 is continued so as to follow the inclined surface 28a of the recess 28 in the front fender 16, the muddy water M is discharged along the inclined surface 28a and the lower side surface 46. As a result thereof, the spoilage of the headlamp device 18 with the muddy water M is further avoided.

The projection 30 extends rearwardly from an intermediate portion of the recess 28 with respect to the forward and rearward direction. Also, in a region of the upper surface of the front fender 16 forwardly of the intermediate portion of the recess 28 with respect to the forward and rearward direction, the side grooves 36 and 36 are formed and positioned at an outer side of the recess 28 with respect to the motorcycle widthwise direction while extending in the forward and rearward direction. In other words, in the region forwardly of the intermediate portion of the recess 28 with respect to the forward and rearward direction as shown in FIG. 5 and, also in the region rearwardly of the intermediate portion of the recess 28 with respect to the forward and rearward direction as shown in FIG. 6, the cross section of the front fender 16 becomes corrugated. Accordingly, the rigidity of the front fender 16 increases.

Since the headlamp device 18 shown in FIG. 1 has a front surface extending substantially vertical with respect to the upper surface of the front fender 16, it is possible to avoid an undesirable run of the muddy water M over the headlamp device 18.

An upper end of the recess 28 shown in FIG. 7 is positioned above a lower surface of the lower bracket 6 and a lower edge of the headlamp 18 is positioned below an upper surface of the lower bracket 6. Accordingly, a gap delimited between the lower end of the headlamp device 18 and the upper surface of the front fender 16 can be blocked by the lower bracket 6 and, therefore, the flow of the incoming wind W and the muddy water M through such gap can be suppressed, thereby to avoid the spoilage of the headlamp device 18 which would be caused by and in contact with the muddy water M.

The lower bracket 6 referred to above has a lower portion, to which the front fender 16 is fixed, and also has an upper portion to which a lower end portion of the headlamp device 18 is fixed. The lower bracket 6 is so disposed as to block the gap, which is delimited between the lower end of the headlamp device 18 and the upper surface of the front fender 16, from rear. The flow of the incoming window W and the muddy water M through such gap can be suppressed, and the spoilage of the headlamp device 18 by and in contact with the muddy water M can be avoided accordingly.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing embodiment of the present invention, the headlamp device has been shown and described as the motorcycle mounted component, the present invention is not necessarily limited thereto and a number plate, a luggage carrier, and/or forward monitoring sensor (such as, for example, a camera) may be employed as the motorcycle mounted component.

Accordingly, such changes and modifications are, unless they depart from the scope of the present invention as delivered from the claims annexed hereto, to be construed as included therein.

REFERENCE NUMERALS

6 . . . Lower bracket
8 . . . Front fork
10 . . . Front wheel
12 . . . Handlebar
16 . . . Front fender
18 . . . Headlamp device (Motorcycle mounted component)
28 . . . Recess
30 . . . Projection
32 . . . Upper edge
34 . . . Side face
34a . . . Lower edge
36 . . . Side groove
40 . . . Recessed area
42 . . . Inclined face

What is claimed is:

1. A motorcycle front structure comprising a front fender to cover above a front wheel and a motorcycle mounted component disposed forwardly of a handlebar, in which:
    a recess is defined at a portion of an upper surface of the front fender forwardly of the motorcycle mounted component, the recess being depressed downwardly and extending in a forward and rearward direction of the motorcycle;
    a projection is defined at an intermediate portion, with respect to a motorcycle widthwise direction, at least in a rear half portion of the recess, the projection extending upwards towards a rear; and the motorcycle mounted component has a lower end edge formed with a recessed area in which the projection engages, wherein
    the projection includes an upper edge, which protrudes upwardly towards the rear, and a pair of left and right side faces inclined downwardly from the upper edge towards a lateral outside with respect to the motorcycle widthwise direction; and
    the left and right side faces have respective lower edges extending outwardly with respect to the motorcycle widthwise direction towards the rear.

2. The motorcycle front structure as claimed in claim 1, in which the projection has a rear portion protrudes upwardly of the upper surface of the front fender.

3. The motorcycle front structure as claimed in claim 1, in which the lower edges of the left and right side faces extend rearwardly to an outer side edge of the front fender with respect to the motorcycle widthwise direction.

4. The motorcycle front structure as claimed in claim 3, in which a pair of left and right inclined faces continued to a rear end of the side face of the projection are formed in a front surface of the motorcycle mounted component.

5. The motorcycle front structure as claimed in claim 1, in which the motorcycle mounted component has a front surface extending substantially vertical with respect to the upper surface of the front fender.

6. The motorcycle front structure as claimed in claim 1, in which the recess has an upper end positioned above a lower surface of a lower bracket for supporting a front fork.

7. The motorcycle front structure as claimed in claim 1 in which the motorcycle mounted component is a headlight device.

8. A motorcycle front structure comprising a front fender to cover above a front wheel and a motorcycle mounted component disposed forwardly of a handlebar, in which:

a recess is defined at a portion of an upper surface of the front fender forwardly of the motorcycle mounted component, the recess being depressed downwardly and extending in a forward and rearward direction of the motorcycle;

a projection is defined at an intermediate portion, with respect to a motorcycle widthwise direction, at least in a rear half portion of the recess, the projection extending upwards towards a rear;

the motorcycle mounted component has a lower end edge formed with a recessed area in which the projection engages, wherein the projection extends from an intermediate portion of the recess with respect to the forward and rearward direction; and in a region of the upper surface of the front fender forwardly of the intermediate portion of the recess with respect to the forward and rearward direction, a side groove is formed so as to be positioned at an outer side of the recess with respect to the motorcycle widthwise direction and to extend in the forward and rearward direction.

9. The motorcycle front structure as claimed in claim 8 in which the motorcycle mounted component is a headlight device.

10. A motorcycle front structure comprising a front fender to cover above a front wheel and a motorcycle mounted component disposed forwardly of a handlebar, in which:

a recess is defined at a portion of an upper surface of the front fender forwardly of the motorcycle mounted component, the recess being depressed downwardly and extending in a forward and rearward direction of the motorcycle;

a projection is defined at an intermediate portion, with respect to a motorcycle widthwise direction, at least in a rear half portion of the recess, the projection extending upwards towards a rear;

the motorcycle mounted component has a lower end edge formed with a recessed area in which the projection engages, wherein the recess has an upper end positioned above a lower surface of a lower bracket for supporting a front fork and the recess has an upper end positioned above a lower surface of a lower bracket for supporting a front fork, and the motorcycle mounted component has a lower edge positioned below an upper surface of the lower bracket.

11. The motorcycle front structure as claimed in claim 10, in which:

the lower bracket has a lower portion to which the front fender is fixed; and the lower bracket has an upper portion to which a lower end portion of the motorcycle mounted component is fixed.

12. The motorcycle front structure as claimed in claim 10 in which the motorcycle mounted component is a headlight device.

* * * * *